United States Patent [19]

Chuang et al.

[11] 4,281,218
[45] Jul. 28, 1981

[54] SPEECH-NONSPEECH DETECTOR-CLASSIFIER

[75] Inventors: Chin-Sheng Chuang, Marlboro; Robert E. LaMarche, Atlantic Highlands, both of N.J.

[73] Assignee: Bell Telephone Laboratories, Incorporated, Murray Hill, N.J.

[21] Appl. No.: 88,634

[22] Filed: Oct. 26, 1979

[51] Int. Cl.$^3$ ............................................. G10L 1/00
[52] U.S. Cl. ............................ 179/1 SC; 179/1 VC
[58] Field of Search ................ 179/1 SC, 1 P, 1 VC, 179/1 SD; 370/81; 340/147 R, 146.3 AQ; 307/231, 233

[56] References Cited

U.S. PATENT DOCUMENTS

| | | | |
|---|---|---|---|
| 3,705,417 | 12/1972 | Asmussen | 328/139 |
| 4,002,841 | 1/1977 | Ching et al. | 179/15 AS |
| 4,027,102 | 5/1977 | Ando et al. | 179/1 VC |
| 4,028,496 | 6/1977 | La March et al. | 179/15 AS |
| 4,100,370 | 7/1978 | Suzuki et al. | 179/1 SD |
| 4,137,510 | 1/1979 | Iwahara | 328/139 |

OTHER PUBLICATIONS

J. Adoule et al., "On Line Speech/Data Identifier," 1977 IEEE Conf. on Acoustics, Speech, Sig. Proc., May 1977, pp. 332-335.
D. Haring, "Sequential-Circuit Synthesis," MIT Press, 1966, Chapter 1.
L. Rabiner, "Evaluation of a Statistical Approach etc.," Bell Tech. J., Mar. 1977, pp. 455-482.

*Primary Examiner*—Mark E. Nosbaum
*Assistant Examiner*—E. S. Kemeny
*Attorney, Agent, or Firm*—Richard J. Roddy

[57] ABSTRACT

The classification of a signal on a telephone line can be based on its short term average energy level; nonspeech (data or signalling) as high level; speech as medium level, and noise as low level. A common use for speech detectors occurs with a time assignment speech interpolation (TASI) system. A speech detector extends a trunk activity signal (TAS) for indicating whether energy or noise is detected on a trunk. Responsive to the TAS signal, a processor processes a signal on the trunk. On occasion, it may be desirable to process different energy signals according to different methodologies. For example, during overload, a TASI system may truncate bits of a speech signal and not truncate bits of a nonspeech signal. For classifying energy signals as between speech signals and nonspeech signals, the instant classifier includes an arrangement for extracting at least one feature, or property, such as the short term power of the signal to be classified. Responsive to the extracted property, an estimator provides a coarse estimate as to whether the signal to be classified is a speech signal or a nonspeech signal. Responsive to the estimate, a six-state, sequency machine provides a fine, classifying signal for classifying the energy signal.

3 Claims, 3 Drawing Figures

NOTE:
A) IF F=1, THEN SC+1/SC WHEN SC<MAX
   AND
   DC-1/DC WHEN DC>0

B) IF F=0, THEN DC+1/DC WHEN DC<MAX
   AND
   SC-1/SC WHEN SC>0

C) 0/SC, 0/DC AT EACH STATE TRANSMISSION

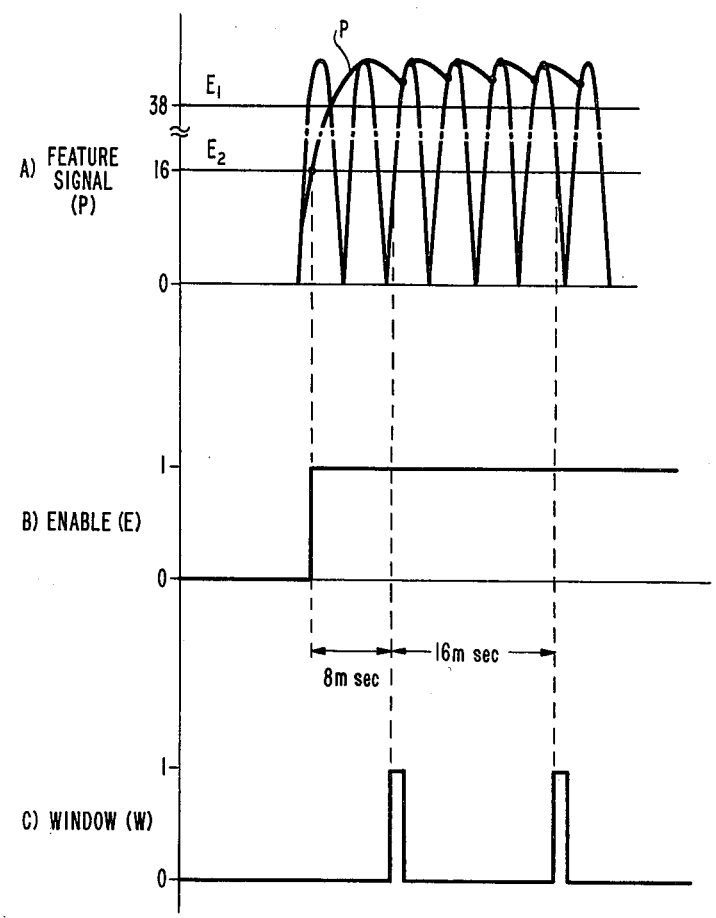

SPEECH-NONSPEECH DETECTOR-CLASSIFIER

TECHNICAL FIELD

This invention relates to signal detectors and, more particularly, to an arrangement for detecting a signal and classifying the signal among one of a plurality of classifications.

BACKGROUND OF THE INVENTION

In a telecommunications system, signals may emanate from a source, e.g., a calling party, and be routed through the system to a sink, e.g., a called party. Between the source and the sink, the signals may be operated upon in a number of ways, usually for improving the efficiency of the system. For example, an analog speech signal may be converted to a digital speech signal, be reconverted, be routed through pulse code modulation (PCM) apparatus, and, perhaps, be routed through time assignment speech interpolation (TASI) apparatus onward ultimately to the sink.

Speech interpolation systems commonly employ speech detectors for detecting a signal on a trunk and classifying the signal among one of a plurality of classifications. A typical speech detector is of the type disclosed in U.S. Pat. No. 4,028,496, entitled "Digital Speech Detector" and issued to R. E. LaMarche et al on June 7, 1977. Although the use of the word "speech" in the phrases "speech detector" and "speech interpolation" may be a misnomer, such use is common in the art. For example, more typically, a speech detector detects energy of a first type and energy of a second type. The first type energy is usually referred to by the generic "energy" while the second type energy is referred to as "noise." Thus, known speech detectors include arrangements for classifying signals between energy and noise.

As mentioned, a common use for speech detectors occurs with systems such as the digital speech interpolation (DSI) system disclosed in U.S. Pat. No. 4,002,841. There a speech detector extends a trunk activity signal (TAS) for indicating whether energy or noise was detected on the trunk. Responsive to the TAS signal, a processor processes a signal on the trunk. For example, if the TAS signal indicates that energy has been detected, the signal on the trunk may be routed toward its sink. The trunk in this instance is said to be "active." On the other hand, if the TAS signal indicates that noise has been detected, the signal on the trunk may not be routed but rather may be disgarded. The trunk in this instance is said to be "inactive." As a result, only signals from active trunks are classified as energy signals for routing through the system.

Also, in the course of routing energy signals through the system, it may be desirable to process different energy signals according to different methodologies. For example, during overload, the DSI system disclosed in the aforementioned U.S. Pat. No. 4,002,841 may truncate bits of the digital signal in an orderly fashion for further improving the efficiency of the system. On the other hand, in arrangements having, for example, a first source computer "talking" to a second sink computer, the source signals may be digital signals and it may be undesirable to truncate bits from the digital signals. Heretofore, telecommunications systems appear to have been peculiarly devoid of apparatus for relatively quickly classifying the routed energy signals as between signals of a first class for processing according to a first methodology, e.g., speech signals, which may have bits truncated, and signals of a second class for processing according to a second methodology, e.g., nonspeech signals, which may not have bits truncated.

SUMMARY OF THE INVENTION

According to our invention the above and other problems are solved by apparatus for classifying a signal among one of a plurality of classifications. The signal to be classified is extended from an input terminal to the classifying apparatus and therein may be preprocessed. The preprocessed signal is extended through a feature extractor for extracting at least one property of the signal to be classified. The extracted feature signal is extended to an estimator for providing an estimate of the classification. A multi-state sequency machine, responsive to the estimate, provides the classifying signal.

BRIEF DESCRIPTION OF THE DRAWING

Our invention should become fully apparent when taken in connection to the following detailed description and the accompanying drawing in which:

FIG. 3 illustrates some wave forms useful in explaining the operation of the classifying apparatus of FIG. 1.

DETAILED DESCRIPTION

According to the principles of our invention, improved communications obtains by classifying a signal detected on a trunk as between a speech signal and a nonspeech signal. Thereafter, speech signals may be processed according to a first methodology while nonspeech signals may be processed according to a second methodology.

Figure 1:
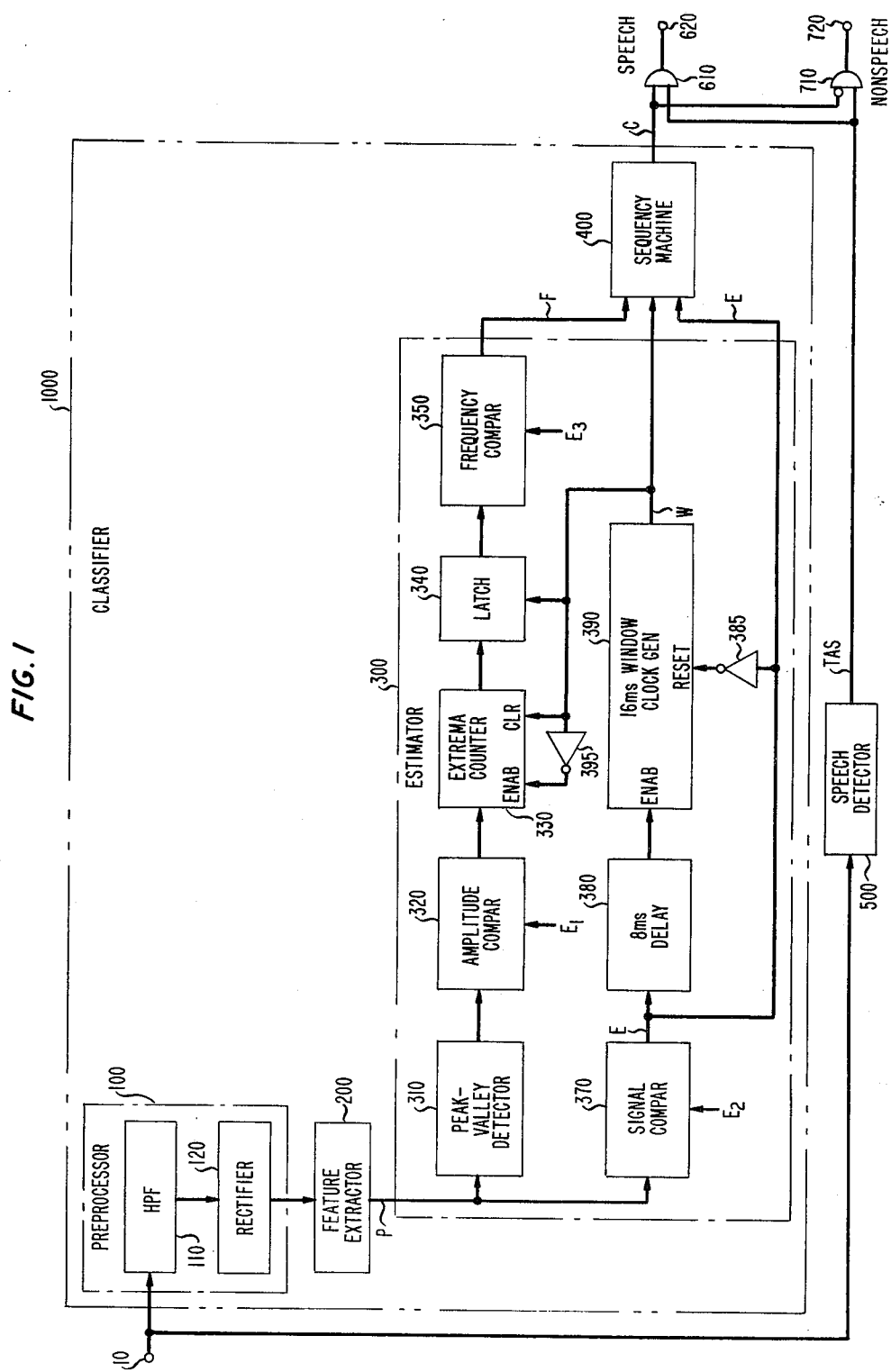
FIG. 1 illustrates classifying apparatus in accord with the principles of our invention.

To aid in understanding the principles of our invention, we refer to FIG. 1. A signal to be classified is extended from input terminal 10 jointly to inputs of classifier 1000 and speech detector 500. Speech detector 500 may be of the type disclosed in the aforecited U.S. Pat. No. 4,028,496. A trunk activity signal (TAS) is extended from an output of speech detector 500 jointly to first inputs of AND gates 610 and 710 for indicating whether energy or noise is detected on a trunk. The TAS signal is assumed to be a logic 1 for indicating the detection of energy and a logic 0 for indicating the detection of noise. Circuitwise coupled in parallel to speech detector 500 is our classifier 1000 for classifying the trunk signal as between a speech signal and a nonspeech signal. As an example, nonspeech signals could be voiceband data signals or signaling tones. A classifying signal C is extended from an output of classifier 1000 jointly to a second input of AND gate 610 and, after inversion, to a second input of AND gate 710. Classifying signal C is a logic 1 for classifying the trunk signal to be speech signal and a logic 0 for classifying the trunk signal to be a nonspeech signal. Hence, in response to a TAS logic 1 signal and a classifying logic 1 signal, a logic 1 signal is extended from an output of AND gate 610 to output terminal 620 for indicating the energy signal to be a speech signal. In parallel fashion, in response to a logic 1 TAS signal and a logic 0 classifying signal, a logic 1 signal is extended from an output of AND gate 710 to output terminal 720 for indicating the energy signal to be a nonspeech signal. It may be noted that, in response to a logic 0 TAS signal for indicating the trunk signal to be noise, a logic 0 signal is extended from an output of each of AND gates 610 and 710 to its respective output terminal. Thereafter, responsive to the signal at output terminal 620, the trunk signals may be processed according to the aforementioned first speech methodology, whereas, responsive to the signal at output terminal 720, the trunk signals may be processed according to the second nonspeech methodology.

More particularly, the input trunk signal, e.g., a signal encoded according to the $\mu=255$ PCM companding law for obtaining a digitally encoded eight-bit signal such as is typically employed in the Bell System T1 Carrier System, is extended from terminal 10 to classifier 1000 and therein through preprocessor 100, for example, for attenuating power line noise and for removing direct current offset by way of high pass filter 110 and for providing the magnitude of the input signal by way of rectifier 120. The preprocessed input signal is thereafter extended to an input of feature extractor 200 for extracting a "feature," or property P, of the input trunk signal. Here, the extracted feature P is illustratively an estimate of the short term power of the signal at input terminal 10. Other features or combinations of features could be extracted and work equally well in accordance with the principles of our invention. Continuing, responsive to at least one extracted signal, estimator 300 provides a signal F for estimating whether the trunk signal is a speech signal (e.g., F equals a logic 1) or a nonspeech signal (e.g., F equals a logic 0). The estimating signal F is extended from an output of estimator 300 to an input of sequency machine 400 for providing the aforementioned classifying signal. Classifying signal C is a logic 1 for indicating a speech signal and a logic 0 for indicating a nonspeech signal.

Classifier 1000 can be more specifically described with reference to both FIG. 1 and FIG. 3. The preprocessed trunk signal is extended from an output of preprocessor 100 through feature extractor 200, which may be a two millisecond, exponentially-mapped-past (EMP) variable, unity scaled (i.e., a gain of unity), low pass filter, for extracting as a feature the short term power of the trunk signal at input terminal 10. Regarding EMP variables, see the aforecited U.S. Pat. No. 4,028,496 and the references cited therein. The extracted feature signal P is extended from an output of feature extractor 200 to estimator 300 and therein jointly to first inputs of peak-valley detector 310 and signal comparator 370.

Functionally, estimator 300 includes an arrangement using amplitude and frequency detection equipment for estimating whether the input signal is a speech signal or a nonspeech signal. Referring to FIG. 3(A), the ordinate represents feature signal P while the abscissa represents time. Also shown in FIG. 3(A), for reference, is a rectified sinusoid. Two energy thresholds, the first energy threshold $E_1$ and the second $E_2$, are noted. Studies have disclosed that the energy level of nonspeech signals such as voiceband data signals is typically larger than the energy level of speech signals. Hence, larger energy level $E_1$ ($=38$) is for setting a minimum nonspeech signal threshold whereas smaller energy threshold $E_2$ ($=16$) is for setting a minimum speech signal threshold. It may be noted that in another embodiment either or both of the energy thresholds may be adaptive, or variable. Also, experimentation has indicated that our classifier properly classifies input signals in the presence of 45 dbrnc0 of noise, which is equivalent to our illustrative energy threshold $E_2$ ($=16$). As the amplitude of extracted feature signal P exceeds energy threshold $E_2$, a logic 1 enable signal E, as shown in FIG. 3(B), is extended from an output of comparator 370 jointly to an input of delay circuit 380 for providing an enable delay to clock generator 390, to an input of inverter 385 for providing a reset signal to generator 390, and to an input of sequency machine 400 for providing our classifying signal C. Delay circuit 380 introduces a predetermined delay, here a delay of about 8 milliseconds, for protecting, for example, against false operation stemming from impulse noise. Upon the expiration of the predetermined delay, clock generator 390 is enabled for providing window signal W. As shown in FIG. 3(C), window signal W includes a logic 1 pulse provided once each predetermined time interval, here once each 16 milliseconds, (a) for enabling latch 340 to extend the output of extrema counter 330 to an input of frequency comparator 350, (b) for resetting extrema counter 330 at the start of each predetermined time interval, and (c) for synchronizing sequency machine 400 with estimator 300. Although other window signals could be used, experimentation has indicated that a 16 msec window signal corresponds acceptably well with a typical pitch period of (what is usually nonstationary) speech. Also, it may be noted that, for a typical 8,000 Hertz sampling rate, a window signal of 16 milliseconds will capture about 128 samples.

Operationally feature signal P is extended to peak-valley detector 310 for detecting the peaks and valleys of the feature signal, i.e., its extrema amplitudes. The amplitude of each peak or valley is extended to one input of amplitude comparator 320. A second input of comparator 320 is first energy threshold $E_1$. Experimentation has indicated that voiceband data signals have energy commonly exceeding $-23$ dbm0, which is equivalent to our illustrative energy threshold $E_1$ ($=38$). Responsive to each peak or valley of feature signal P exceeding energy threshold $E_1$, a logic 1 increment signal is extended from an output of amplitude comparator 320 to an input of extrema counter 330. Responsive thereto, counter 330 is incremented by unity and the count therein extended to latch 340 and therethrough, as aforementioned, responsive to a logic 1 pulse in window signal W. Thereby, estimator 300 includes amplitude detection equipment for use in estimating the classification of the input signal.

The count in latch 340, responsive to a next logic 1 pulse in window signal W, is extended to one input of frequency comparator 350. A second input of comparator 350 is a third threshold $E_3$ for indicating a minimum frequency signal to be classified. Here we assume frequency threshold $E_3$ to be 40. It should be clear that the count in latch 340 when divided by the predetermined time interval, here 16 milliseconds, defines a frequency. Also, it should be noted that counter 330 is incremented four times during a typical sinusoidal period. Hence it should be clear that having the third threshold $E_3$ ($=40$) is equivalent to detecting signals having a minimum frequency of about 625 Hertz. Thereby, estimator 300 includes frequency detection equipment for use in estimating the classification of the input signal.

Continuing, responsive to an extrema count of less than 40, frequency comparator 350 extends a logic 1 estimating signal F to sequency machine 400 for indicating that the input signal is estimated to be a speech signal. Conversely, responsive to an extrema count of at least 40, frequency comparator 350 so extends a logic 0 estimating signal F for indicating that the input signal is estimated to be a nonspeech signal.

Figure 2:
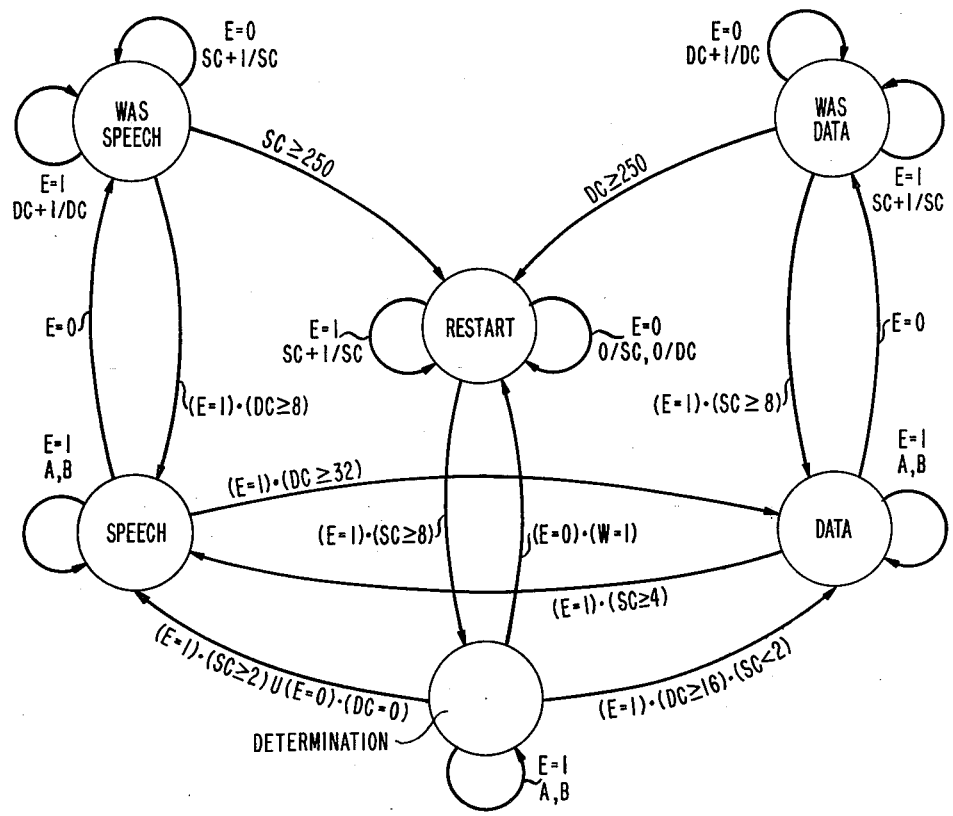
FIG. 2 illustrates a state diagram which may be embodied in the sequency machine of FIG. 1.

Sequency machine 400 is a state driven, sequential machine which, responsive to coarse estimating signal F, enable signal E and window signal W, provides a fine classifying signal C in accordance with the principles of our invention. A common means for describing a sequential machine is by way of a state diagram. See, for example, Donald R. Haring, *Sequential-Circuit Synthesis: State Assignment Aspects* (Cambridge, Mass.: The MIT Press, 1966). FIG. 2 illustrates a state diagram of sequency machine 400. In particular, machine 400 includes six states:

1. RESTART,
2. DETERMINATION,
3. DATA,
4. WAS DATA,
5. SPEECH, and
6. WAS SPEECH.

Prior to describing the state diagram, some assumptions and notational aspects are made clear. Firstly, sequency machine 400 uses two counters, one labeled speech counter (SC) and the other labeled data counter (DC). The SC and DC counters may be any standard binary n-bit counters which are incremented or decremented by unity in response to a logic 1 pulse. Further, we assume that SC and DC counters to be up/down, 8-bit, non-negative counters, i.e., capable of counting between zero and a saturation count of 255.

Secondly, as to the operation of the counters, in the RESTART state, the SC counter is incremented responsive to a one millisecond clock pulse signal. In the WAS DATA state, the SC counter is incremented responsive to a one millisecond clock and the DC counter is incremented responsive to a four millisecond clock. In the WAS SPEECH state, the SC counter is incremented responsive to a four millisecond clock and the DC counter is incremented responsive to a one millisecond clock. In the DETERMINATION state, SPEECH state, and DATA state, both the SC and DC counters are incremented or decremented responsive to window signal W. Further and as is hereinafter made more clear, the incrementing or decrementing of a counter is coincident to the aforedescribed clock pulse signal or window signal and to estimating signal F.

Thirdly, the symbol 0/SC and the symbol 0/DC mean that the respective SC and DC counters are zeroed. Also, as shown in Note C on FIG. 2, the SC and DC counters are zeroed on each state transition, for example, on a transition from the RESTART state to the DETERMINATION state. Too, the symbol DC+1/DC and the symbol SC+1/SC mean that the respective counters are incremented by unity. The symbol SC−1/SC and the symbol DC−1/DC mean that the respective counters are decremented by unity. The counter to be incremented or decremented is identified by estimating signal F. That is, the SC counter is operated upon responsive to a logic 1 speech estimating signal F, and the DC counter responsive to a logic 0 nonspeech estimating signal F. Again, the incrementing or decrementing occurs in coincidence with the logic 1 pulse of a clock signal or the window signal W as aforedescribed.

Fourthly, the symbol shown on a transition line from one state to another state defines the event or events which must be detected before the transition occurs. For example, the transition from the DETERMINA- TION state to the DATA state occurs upon detection of the coincidence of the following three events:

(1) a logic 1 enable signal E AND
(2) the DC counter having a prefixed count, here a count of at least 16, AND
(3) the SC counter having a prefixed count, here a count of less than 2.

It may be noted, in FIG. 2, the symbol . means a logic AND function while the symbol U means a logic OR function.

Fifthly, and as aforementioned, speech and nonspeech signals may be processed by different methodologies. Accordingly, and on the one hand, in our illustrative embodiment, while in any of the first four of the above six enumerated states, sequency machine 400 provides a logic 0 nonspeech classifying signal. On the other hand, while in either the SPEECH or the WAS SPEECH states, sequency machine 400 provides a logic 1 speech classifying signal.

Sixthly, our description of the state diagram commences with the RESTART state. We assume the input signal to be a nonspeech signal and more particularly, for ease of description, we assume the nonspeech signal to be a voiceband data signal.

RESTART State

The RESTART state is a state to which sequency machine 400 typically returns upon detection of an inactive trunk. It will be recalled that, while in the RESTART state, sequency machine 400 provides a logic 0 nonspeech classifying signal C.

Two branches loop upon the RESTART state. As to one branch, responsive to a logic 0 enable signal E, the SC and DC counters are zeroed and sequency machine 400 remains in the RESTART state. It will be recalled that a logic 0 enable signal E implies that the energy of the signal to be classified does not exceed the second energy threshold $E_2$. As to the second branch, responsive to a logic 1 enable signal E, the SC counter is incremented responsive to the logic 1 pulse of a one millisecond clock pulse signal. Upon detection of the coincidence of the SC counter being incremented to a prefixed count, here a count of 8, AND a logic 1 enable signal E, a transition occurs from the RESTART state to the DETERMINATION state. Recall that upon the state transition, the SC and DC counters are zeroed.

DETERMINATION State

The DETERMINATION state is a state for initially determining whether the signal to be classified is a speech signal or a nonspeech signal. It will be recalled that, while in the DETERMINATION state, sequency machine 400 provides a logic 0 nonspeech classifying signal C.

One branch loops upon the DETERMINATION state. As to that branch, responsive to a logic 1 speech estimating signal F (see Note A in FIG. 2), the SC counter is incremented and the DC counter is decremented. Conversely, responsive to a logic 0 nonspeech estimating signal F (see Note B in FIG. 2), the SC counter is decremented while the DC counter is incremented. Upon detection of the SC and DC counters being incremented to respective prefixed counts, a transition occurs from the DETERMINATION state to either the DATA state or the SPEECH state.

More particularly, the transition from the DETERMINATION state to the DATA state occurs upon detection of the coincidence of the following three events:
(1) a logic 1 enable signal E, AND
(2) the DC counter having a prefixed count, here a count of at least 16, AND
(3) the SC counter not exceeding a prefixed count, here a count of less than 2.

Alternatively, a transition from the DETERMINATION state to the SPEECH state occurs EITHER upon detection of the coincidence of the following two events:
(1) a logic 1 enable signal E AND
(2) the SC counter having a prefixed count, here a count of at least 2.

OR upon detection of the coincidence of the following two events:
(1) a logic 0 enable signal E AND
(2) the DC counter having a prefixed count, here a count of 0.

Of course, while sequency machine 400 is in the DETERMINATION state, the energy of the signal to be classified may drop below the second energy threshold $E_2$. In such event, a logic 0 enable signal E occurs at the output of comparator 370. A transition from the DETERMINATION state to the RESTART state occurs upon detection of the coincidence of the following two events:
(1) a logic 0 enable signal E AND
(2) the logic 1 pulse of window signal W.

DATA State

The DATA state is a state wherein sequency machine 400 remains in the presence of nonspeech signals. It will be recalled that, while in the DATA state, sequency machine 400 provides a logic 0 nonspeech classifying signal C.

One branch loops upon the DATA state. As to that branch, the SC and DC counters are incremented and decremented in a manner similar to that aforedescribed for the DETERMINATION state branch loop (see Notes A and B in FIG. 2).

A transition from the DATA state to the SPEECH state occurs upon detection of the coincidence of the following two events:
(1) a logic 1 enable signal E AND
(2) the SC counter having a prefixed count, here a count of at least 4.

Alternatively, a transition from the DATA state to the WAS DATA state occurs upon detection of a logic 0 enable signal E, which as aforementioned implies that the energy of the signal to be classified does not exceed the second energy threshold $E_2$.

WAS DATA State

The WAS DATA state is a state in which sequency machine 400 may idle itself upon detection of insufficient energy in the signal to be classified. It will be recalled that, while in the WAS DATA state, sequency machine 400 provides a logic 0 nonspeech classifying signal C.

Two branches loop upon the WAS DATA state. As to one branch, responsive to a logic 0 enable signal E, the DC counter is incremented by unity. As to the second branch, responsive to a logic 1 enable signal E, the SC counter is incremented by unity. As aforementioned, the actual incrementing of the DC counter occurs responsive to a logic 1 pulse of the four millisecond clock and the incrementing of the SC counter occurs responsive to the logic 1 pulse of the one millisecond clock.

A transition from the WAS DATA state to the DATA state occurs upon detection of the coincidence of the following two events:
(1) a logic 1 enable signal E AND
(2) the SC counter having a prefixed count, here a count of at least 8.

Alternatively, a transition from the WAS DATA state to the RESTART state occurs upon detection of the DC counter having a prefixed count, here a count of at least 250.

SPEECH State

The SPEECH state is a state where the sequency machine 400 remains in the presence of speech signals. It will be recalled that, while in the SPEECH state, sequency machine 400 provides a logic 1 speech classifying signal C.

One branch loops upon the SPEECH state. As to that branch, the SC and DC counters are incremented and decremented in a manner similar to that aforedescribed for the DETERMINATION state branch loop (see Notes A and B in FIG. 2).

A transition from the SPEECH state to the DATA state occurs upon detection of the coincidence of the following two events:
(1) a logic 1 enable signal E AND
(2) the DC counter having a prefixed count, here a count of at least 32.

Alternatively, a transition from the SPEECH state to the WAS SPEECH occurs upon detection of a logic 0 enable signal E, which as aforementioned implies that the energy of the signal to be classified does not exceed the second energy threshold $E_2$.

WAS SPEECH State

The WAS SPEECH state is a state which sequency machine 400 may idle itself upon detection of insufficient energy in the signal to be classified. It will be recalled that, while in the WAS SPEECH state, sequency machine 400 provides a logic 1 speech classifying signal C.

Two branches loop upon the WAS SPEECH state. As to one branch, responsive to a logic 0 enable signal E, the SC counter is incremented by unity. As to the second branch, responsive to a logic 1 enable signal E, the DC counter is incremented by unity. As aforementioned, the incrementing of the SC counter occurs responsive to the logic 1 pulse of the four millisecond clock and the incrementing of the DC counter occurs responsive to the logic 1 pulse of the one millisecond clock.

A transition from the WAS SPEECH state to the SPEECH state occurs upon detection of the coincidence of the following two events:
(1) a logic 1 enable signal E AND
(2) the DC counter having a prefixed count, here a count of at least 8.

Alternatively, a transition from the WAS SPEECH state to the RESTART state occurs upon detection of the SC counter having a prefixed count, here a count of at least 250.

Although the invention has been described and illustrated in detail, it is to be understood that the same is by way of illustration and example only. The spirit and scope of the invention are limited only by the terms of the appended claims.

We claim:

1. Apparatus for classifying a signal among one of a plurality of classifications, said classifying apparatus including an input terminal for receiving said signal to be classified, means coupled to said input terminal for classifying said signal, means for extending a classifying signal from said classifying means to an output terminal and characterized in that said classifying apparatus further comprises:

means for extending said signal to be classified through a feature extractor, said feature extractor for extracting at least one property of said signal to be classified, an estimator responsive to said property for providing an estimate of said classification, a sequency machine responsive to said estimate for providing said classifying signal, a speech detector responsive to said signal to be classified for providing a TAS signal, and means responsive to said classifying signal and to said TAS signal for providing a methodology signal to at least one output terminal.

2. The classifying apparatus of claim 1 wherein said estimator further comprises:

means for detecting the number of extrema of said property which exceeds a predetermined threshold;

means responsive to said number of extrema for detecting a minimum frequency feature signal; and means responsive to said number of extrema and said minimum frequency for providing said estimate of said classification.

3. The classifying apparatus of claim 1 wherein said sequency machine further comprises: transition means for moving among a plurality of states in response to an enable signal, to said estimating signal and to a window interval signal, said transition moving being according to a predetermined state relationship, and said transition moving being responsive to the number of window intervals in which said estimating signal is of a first state and the number of window intervals in which said estimating signal is of a second state.

* * * * *